(12) United States Patent
Laurent

(10) Patent No.: US 8,037,957 B2
(45) Date of Patent: Oct. 18, 2011

(54) GROUND INTERFACE FOR A VEHICLE

(75) Inventor: Daniel Laurent, Marly (CH)

(73) Assignee: Michelin Recherche et Technique S.A., Granges-Paccot (CH)

( * ) Notice: Subject to any disclaimer, the term of this patent is extended or adjusted under 35 U.S.C. 154(b) by 510 days.

(21) Appl. No.: 12/294,179

(22) PCT Filed: Mar. 20, 2007

(86) PCT No.: PCT/EP2007/052644
§ 371 (c)(1),
(2), (4) Date: Dec. 29, 2008

(87) PCT Pub. No.: WO2007/107570
PCT Pub. Date: Sep. 27, 2007

(65) Prior Publication Data
US 2009/0101425 A1  Apr. 23, 2009

(30) Foreign Application Priority Data
Mar. 23, 2006 (FR) ...................................... 06 02550

(51) Int. Cl.
*B60K 1/00* (2006.01)
(52) U.S. Cl. .................................... 180/65.51; 180/65.6
(58) Field of Classification Search ............... 180/65.51, 180/165, 65.3, 65.6
See application file for complete search history.

(56) References Cited

U.S. PATENT DOCUMENTS

| | | | |
|---|---|---|---|
| 4,991,698 A * | 2/1991 | Hanson ........................ | 188/380 |
| 5,465,806 A | 11/1995 | Higasa et al. | |
| 6,113,119 A * | 9/2000 | Laurent et al. ............. | 280/124.1 |
| 6,257,604 B1 * | 7/2001 | Laurent et al. ......... | 280/124.127 |
| 6,276,474 B1 * | 8/2001 | Ruppert et al. .............. | 180/65.6 |
| 6,461,265 B1 * | 10/2002 | Graham et al. ..................... | 475/5 |
| 6,722,459 B1 * | 4/2004 | Wendl et al. ............... | 180/65.51 |
| 7,216,731 B2 * | 5/2007 | Kakinami et al. .......... | 180/65.51 |
| 7,347,295 B2 * | 3/2008 | Kurata ........................ | 180/65.51 |
| 7,350,605 B2 * | 4/2008 | Mizutani et al. ........... | 180/65.51 |
| 7,350,606 B2 * | 4/2008 | Brill et al. .................. | 180/65.51 |
| 7,556,580 B2 * | 7/2009 | Saito et al. ..................... | 475/154 |
| 7,641,010 B2 * | 1/2010 | Mizutani et al. ........... | 180/65.51 |
| 7,644,938 B2 * | 1/2010 | Yamada ................... | 280/86.758 |
| 7,703,565 B2 * | 4/2010 | Ikenoya et al. ............ | 180/65.51 |

(Continued)

FOREIGN PATENT DOCUMENTS
DE   19 30 501   1/1971
(Continued)

*Primary Examiner* — Jeffrey J Restifo
(74) *Attorney, Agent, or Firm* — Cozen O'Connor

(57) ABSTRACT

A ground connection for a vehicle comprising a wheel (1), a sliding suspension for a wheel carrier relative to a support (10) connected to the vehicle, the suspension comprising a substantially vertical pillar (8) fixed to the wheel carrier, the degree of freedom of suspension of the wheel carrier relative to the support (10) being permitted by the movement of the pillar in the guide means (11) connected to the support, means for driving the wheel by a first rotary electric machine (15) mounted in the wheel, the first electric machine driving the wheel by means of reversible reduction means, the reduction means comprising a ring gear (16) fixed to the wheel and a drive pinion (17) connected to the first machine and defining a reduction ratio between the speed of rotation of the first machine and the speed of rotation of the wheel, the reduction ratio being greater than 10, said ground connection having no mechanical service brake.

15 Claims, 6 Drawing Sheets

U.S. PATENT DOCUMENTS

| | | | |
|---|---|---|---|
| 7,735,589 B2 * | 6/2010 | Sugiyama | 180/65.51 |
| 7,766,110 B2 * | 8/2010 | Suzuki et al. | 180/65.51 |
| 7,770,677 B2 * | 8/2010 | Takenaka | 180/65.51 |
| 7,789,178 B2 * | 9/2010 | Mizutani et al. | 180/65.51 |
| 7,861,813 B2 * | 1/2011 | Gashi et al. | 180/65.51 |
| 2002/0023791 A1 * | 2/2002 | Kima et al. | 180/65.5 |
| 2005/0056471 A1 * | 3/2005 | Kurata | 180/65.5 |
| 2006/0144626 A1 * | 7/2006 | Mizutani et al. | 180/65.5 |
| 2007/0068715 A1 * | 3/2007 | Mizutani et al. | 180/65.5 |
| 2007/0169972 A1 * | 7/2007 | Suzuki et al. | 180/65.5 |
| 2008/0283315 A1 * | 11/2008 | Suzuki et al. | 180/65.5 |
| 2008/0289891 A1 * | 11/2008 | Yogo et al. | 180/65.5 |
| 2009/0101425 A1 * | 4/2009 | Laurent | 180/65.51 |
| 2009/0133944 A1 * | 5/2009 | Nishioka et al. | 180/65.51 |
| 2010/0000811 A1 * | 1/2010 | Iwano | 180/65.51 |

FOREIGN PATENT DOCUMENTS

| | | |
|---|---|---|
| DE | 31 19 976 | 12/1982 |
| DE | 100 54 368 | 5/2002 |
| EP | 0 878 332 | 11/1998 |
| EP | 1 616 731 | 1/2006 |
| FR | 2 663 591 | 12/1991 |
| WO | WO 01/76902 | 10/2001 |

* cited by examiner

GROUND INTERFACE FOR A VEHICLE

RELATED APPLICATIONS

This is a U.S. National Phase Application under 35 USC 371 of International Application PCT/EP2007/052644, filed on Mar. 20, 2007.

This application claims the priority of French patent application no. 06/02550 filed Mar. 23, 2006, the subject matter of which is hereby incorporated by reference.

FIELD OF THE INVENTION

The present invention relates to the ground connection of motor vehicles. It relates, in particular, to ground connection systems in which the vertical suspension uses a slideway and the propulsion of the vehicle uses an electric motor, the slideway and the motor being embedded inside the wheel.

BACKGROUND OF THE INVENTION

Such a ground connection is known from the patent application EP 0878332 in which the degree of freedom of vertical suspension of the wheel carrier relative to the chassis of the vehicle is permitted by the movement of a vertical pillar fixed to the wheel carrier in guide means fixed to a support, the support being itself connected to the body of the vehicle. This ground connection also incorporates a rotary traction motor, reduction means connecting the traction motor to the wheel, disc brake means, a suspension spring, an electric machine for controlling the suspension movements and a pivot permitting the steering of the wheel. The structure of this ground connection effectively makes it possible to ensure all the functions provided.

SUMMARY OF THE INVENTION

One object of the invention is to propose a ground connection of the aforementioned type in which the compromise between the mass, rigidity and spatial requirement is substantially improved.

More specifically, the mass of a ground connection, in particular the mass of its non-suspended part, is an essential aspect of the dynamic performance of the vehicle. The mechanical rigidity of a ground connection is also an essential aspect. Insufficient rigidity may have a negative effect on the quality of the guidance of the wheel plane but also damaging consequences for the service life of the elements of the ground connection, due for example to the fatigue of the materials or wear associated with friction caused by deformation. It is understood that the spatial requirement is a particularly important feature since a specific advantage of this type of ground connection is to integrate all the functions in the internal volume of the wheel.

The person skilled in the art knows that these three features (mass, rigidity, spatial requirement) are closely linked to one another. It may also be said, therefore, that the invention aims to propose a ground connection of the aforementioned type for which one at least of the three aspects is significantly improved without necessarily penalizing the other aspects.

A further object of the invention is to permit the maintenance of a ground connection of the aforementioned type to be significantly simplified.

These objects are achieved by a ground connection for a vehicle comprising a sliding suspension of a wheel carrier relative to a support (10) connected to the vehicle, the suspension comprising a substantially vertical pillar (8) fixed to the wheel carrier, the degree of freedom of suspension of the wheel carrier relative to the support (10) being permitted by the movement of the pillar in the guide means (11) connected to the support, a wheel, means for driving the wheel by a first rotary electric machine mounted in the wheel, the first electric machine driving the wheel by means of reversible reduction means, the reduction means comprising a ring gear fixed to the wheel and a drive pinion connected to the first machine and defining a reduction ratio between the speed of rotation of the first machine and the speed of rotation of the wheel, the reduction ratio being greater than 10, said ground connection having no mechanical service brake.

Preferably, the reduction ratio is greater than 15 and further preferably, the reduction means comprise two reduction stages.

Preferably, the reduction means comprise a reduction gear cooperating, on the one hand, with the drive pinion and, on the other hand, with the ring gear fixed to the wheel. Further preferably, the reduction gear comprises two coaxial and integral gearwheels, the teeth of the two gearwheels being helical and oriented in the same direction.

Preferably, the axis of rotation of the first machine is parallel to the axis of rotation of the wheel.

Preferably, the drive pinion has helical teeth and is guided relative to the axis of the wheel independently of the shaft of the first machine.

Preferably, the guidance of the rotating assembly comprising the wheel and the ring gear is provided by a pair of rolling bearings arranged about a male part of the wheel carrier.

Further preferably, the ground connection further comprises a second rotary electric machine for controlling the suspension movements, the second machine being fixed to the guide means, a suspension pinion being driven by the second machine, the suspension pinion cooperating with a rack fixed to the pillar. Further preferably, the axis of the pillar is positioned substantially in the central plane of the wheel and intersects the axis of rotation of the wheel.

Preferably, the ground connection further comprises a pivoting connection of the guide means relative to the support in order to permit the steering of the wheel about a pivot axis, the pivot axis preferably corresponding substantially to the axis of the pillar.

The invention also relates to a vehicle comprising such a ground connection and further comprising means for absorption of electrical energy capable of absorbing the electrical energy produced by the first electrical machine during braking.

Preferably, the means for absorption comprise an electrical resistor immersed in a bath of heat-transfer liquid. Further preferably, the means for absorption comprise means for storing electrical energy capable of storing a portion of the electrical energy produced by the first electrical machine during braking.

BRIEF DESCRIPTION OF THE DRAWINGS

Further objects and advantages of the invention will appear more clearly from the following description of a preferred embodiment. The figures show, respectively.

DETAILED DESCRIPTION OF THE DRAWINGS

Figure 1:
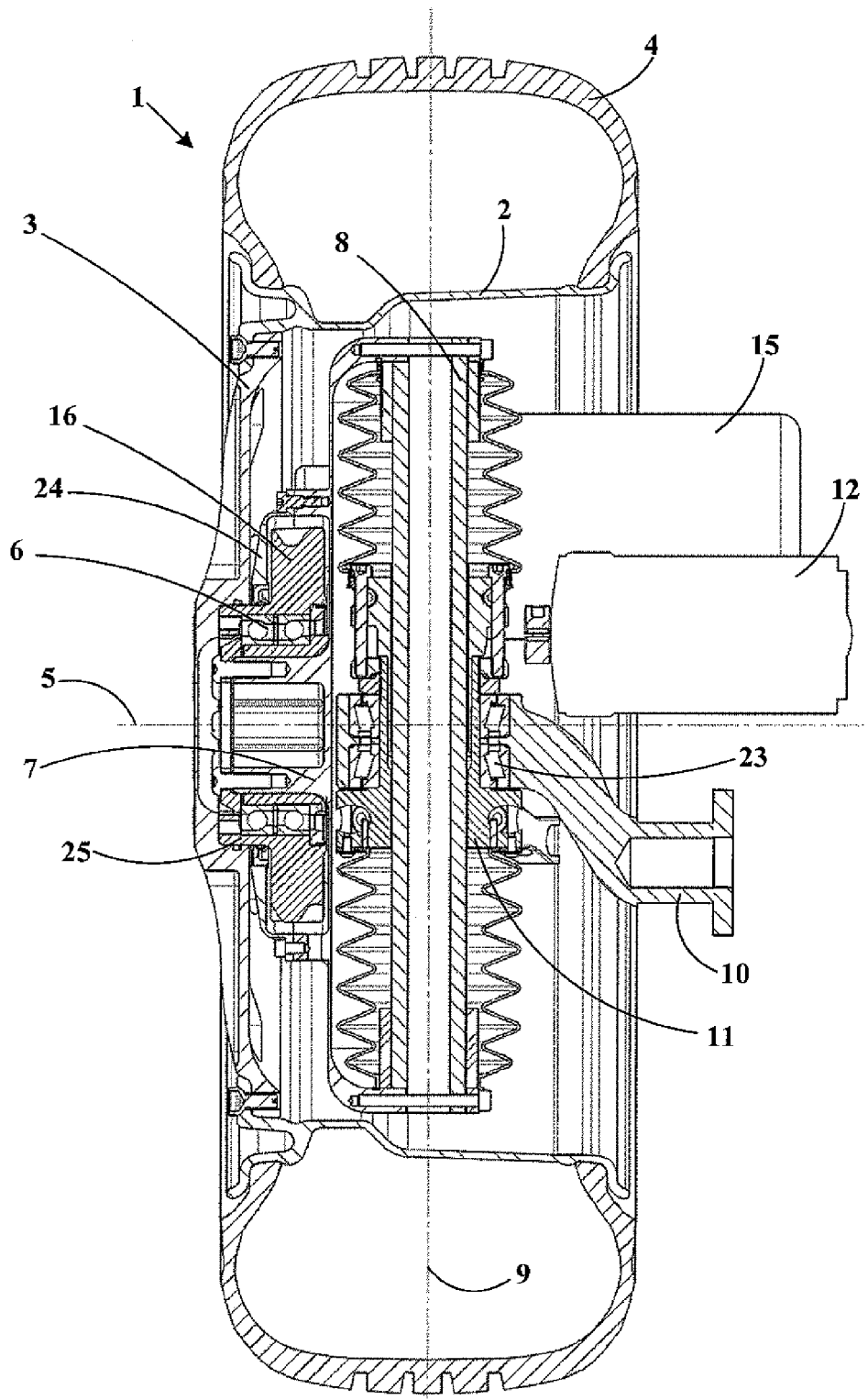
FIG. 1: sectional view according to a vertical plane comprising the axis of rotation of the wheel of a ground connection according to the invention.

A wheel 1 is seen in the figures. The wheel is assembled from a wheel rim 2 and a wheel disc 3. A tire 4 mounted on the wheel rim 2 is shown. The wheel is rotatably mounted about its axis 5 by means of rolling bearings 6 on a wheel carrier 7.

The motorization of the vehicle is provided by means for driving the wheel comprising a rotary electric traction machine 15 mounted on the wheel carrier 7. According to an essential feature of the invention, the electric traction machine is further used to brake the vehicle. When "braking" is discussed in this case, the term is understood to be not only the action which consists in decelerating the vehicle but also permitting its rapid and complete stop by transmitting to the wheel a braking torque such that it is possible to immobilize the wheel while the vehicle is moving. This braking function is thus completely different from the concept of recovering energy ("regenerative braking") well known in the field of electrical vehicles, without it being possible to dispense completely with conventional braking means.

An essential feature of the ground connection according to the invention is thus that it has no mechanical service brake, i.e. no conventional braking means using friction such as a disc brake or drum brake. By the term "service brake" is understood the brake which provides the braking when the vehicle is moving. This service brake is different from the parking brake which itself has the function of immobilizing the vehicle after stopping, for example during the absence of the driver. This immobilization function does not require any particular capacity for dissipating energy. It is understood, therefore, that the ground connection according to the invention may comprise a mechanical parking brake although it does not comprise a mechanical service brake.

The rotary electrical traction machine 15 is simultaneously a rotary electrical braking machine. It is thus capable itself of ensuring the braking and driving of the wheel. This is why, depending on the context, in the present application the terms "traction machine", "traction/braking machine" or "first machine" will be used for the same item, this item having the reference numeral 15 on the drawings.

The traction/braking machine 15 is connected to the wheel by means of reduction means. The reduction means comprise at least one ring gear 16 fixed to the wheel and a pinion 17 driven by the traction machine 15. The reduction ratio, i.e. the ratio between the speed of rotation of the fraction machine and that of the wheel is greater than 10 to 1. Preferably the reduction ratio is greater than 15 to 1. This reduction ratio may be obtained directly by the meshing of the pinion 17 and the ring gear 16.

Preferably, however, the reduction means comprise two reduction stages in the form shown here of a reduction gear 13 acting between the pinion 17 and the ring gear 16. The reduction ratio determined by the reduction means is unique and fixed.

The reduction gear 13 comprises in this case two coaxial and integral gearwheels 131 and 132, the primary wheel 131 meshing with the pinion 17 of the traction/braking machine and the secondary wheel 132 (of reduced diameter relative to the primary wheel) meshing with the ring gear 16. Preferably the reduction gear 13 is guided relative to the wheel carrier 7 by means of a pair of rolling bearings with conical rollers 14 and an axial screw 134 absorbs the axial component of the forces transmitted by the conical rolling bearings to their supports.

Preferably, the teeth of the primary and secondary wheels, of the pinion and of the ring gear are helical. The angles of the teeth are such that the reduction means remain reversible, i.e. they may rotate both in one direction and in the other but also transmit a torque of the traction/braking machine to the wheel and from the wheel to the traction/braking machine with acceptable efficiency. Preferably, the angles of the teeth of the primary and secondary wheels are oriented in the same direction. This characteristic makes it possible to minimize the axial force acting on the reduction gear and thus on the wheel carrier.

Preferably, the guidance of the pinion 17 is a function entirely implemented by the wheel carrier, for example by means of a pair of rolling bearings 18 with balls or rollers. The pinion thus comprises its own guide means, independent of the guide means of the shaft of the traction/braking machine 15. The pinion naturally remains driven in rotation by the shaft of the machine, by connecting means such as, for example, complementary grooves known per se. In this manner, whatever the intensity of the torque transmitted, the quality of the meshing of the pinion with the ring gear or with the reduction gear remains satisfactory as it is neither attributed to the rigidity nor to the efficient guidance of the shaft of the traction/braking machine. Moreover, the axial forces acting on the pinion 17 are not transmitted to the shaft of the traction machine.

Advantageously, the part forming the ring gear 16 also forms the hub on which the wheel is fixed. To achieve this, the wheel rolling bearings 6 are arranged in a bore of the central part of the ring gear and the wheel is bolted to an axial extension 25 of this central part.

Preferably, the rolling bearings 6 are arranged substantially in the same plane as the ring gear 16. It is understood that this advantageous arrangement regarding the axial spatial requirement also permits a reduction in the mass and/or an increase in the rigidity.

Preferably, as shown in the figures, the axis of the first machine 15, the axis of the reduction gear 13 and the axis of rotation of the wheel 5 are parallel.

Figure 6:
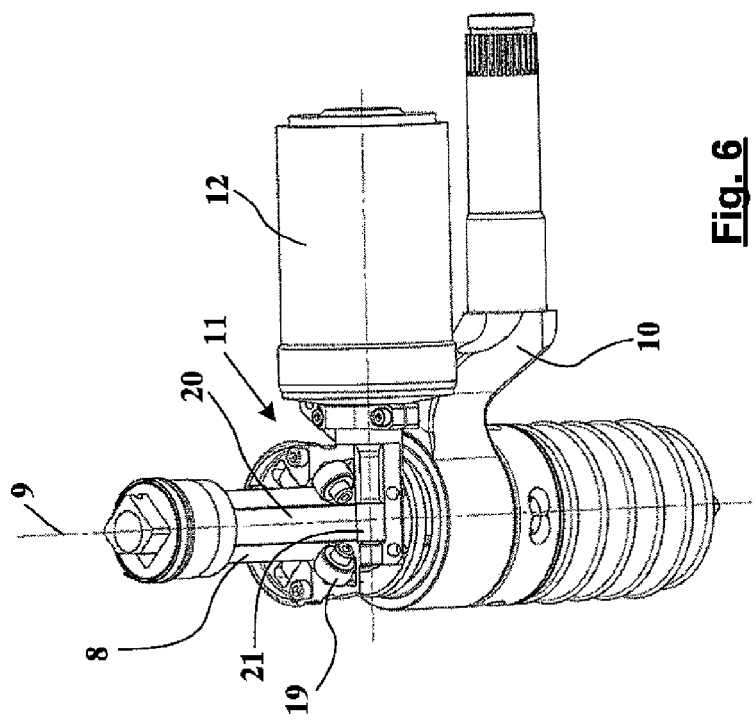
FIG. 6: views in perspective and in partial section of the members for guiding and controlling the suspension of the ground connection according to the invention.
Figure 5:
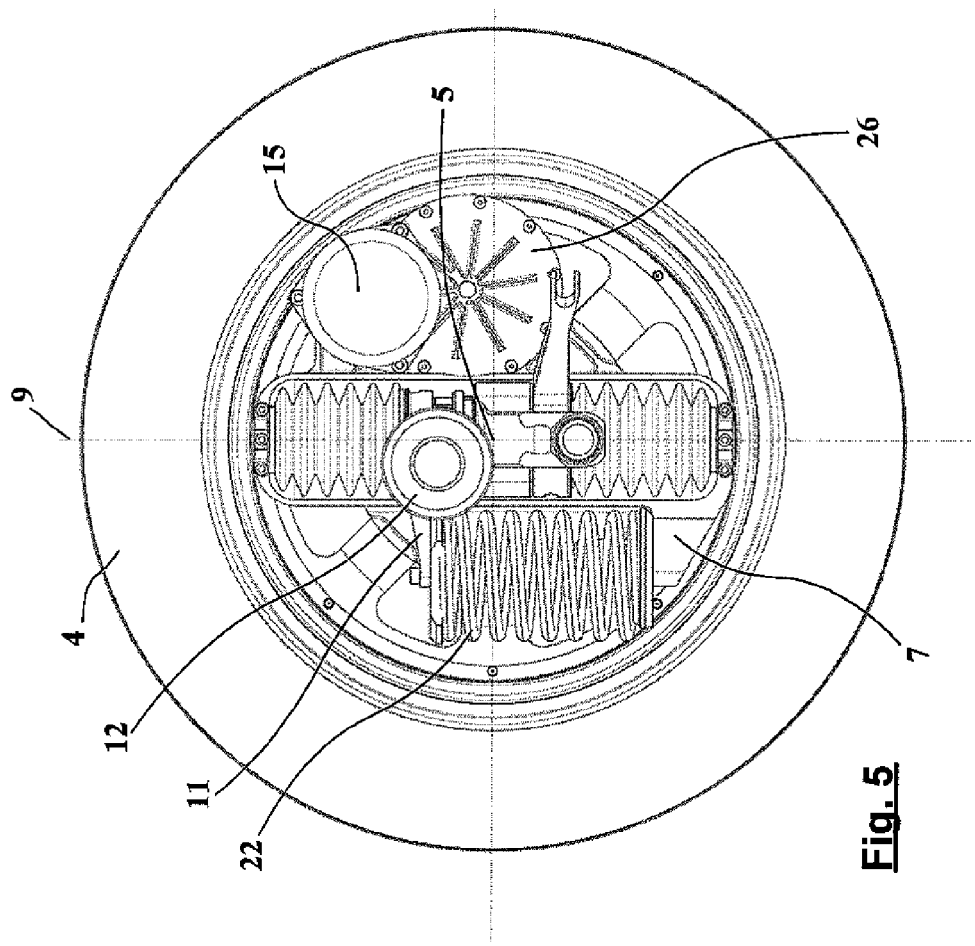
FIG. 5: plan view of the ground connection from the inside of the vehicle.

The suspension of the ground connection according to the invention is a sliding suspension. The wheel carrier is fixed to a substantially vertical pillar 8. The pillar may slide along its axis 9 relative to a support 10 by means of guide means 11, for example with rollers 19 as clearly visible in FIG. 6. This sliding movement corresponds to the suspension clearance of the ground connection. Preferably, the behaviour of the suspension is actively controlled by a second rotary electric machine 12. In the present application, the term "suspension machine" is also used for this second machine. The support 10 is intended to connect the ground connection to the body of the vehicle, either rigidly or by a connection allowing additional degrees of freedom, such as for example a variation of the height of the body and/or of the wheel camber angle (for example according to the teaching of the patent application EP 1616731, the content of which is hereby incorporated by reference), filtering of vibrations or a horizontal suspension.

Preferably, the wheel carrier 7 comprises a male part around which the wheel rolling bearings 6 are fitted. The assembly consisting of the wheel and the ring gear is thus guided by this double ball bearing about a fixed part of the wheel carrier. Relative to the arrangement of the application EP 0878332 in which the wheel rolling bearings are held in a central opening of the wheel carrier, the intrinsic rigidity of the guidance of the wheel is thus substantially increased.

The guide means 11 of the pillar 8 in translation are "without friction", i.e. they have as little friction as possible. Guidance by rolling bearings is very appropriate. Rollers 19 may be used cooperating with bearing races formed on the pillar, the rollers being rotatably mounted on and relative to the guide member 11. Mutually sliding contact surfaces may also be conceived, to the extent that they comprise an appropriate treatment or to the extent that they are sufficiently lubricated. For example, a fluid bearing may be used.

The suspension machine 12 acts by means of a suspension pinion 21 on a rack 20 fixed to the pillar 8. This arrangement (see in particular FIG. 6) has the advantage of lending itself particularly well to the active control of the suspension characteristics, and more precisely to the control by direct electrical means.

Preferably, a spring 22 (for example a helical spring) acts between the wheel carrier 7 and the guide member 11 in order to absorb a portion and preferably all of the reference static load of the vehicle.

Preferably, the axis 9 of the pillar is positioned substantially on the axis of rotation of the wheel 5 and substantially vertically in the central plane of the wheel, i.e. the pillar is perfectly centred relative to the wheel. One advantage of this arrangement is that it is advantageous for the suspension path and reduces the mechanical stresses on the pillar and on its guidance.

Further preferably, when the wheel is a drive wheel of the vehicle, the axis 9 of the pillar also corresponds to the axis of the steering pivot. This is the case shown here. It is seen in FIG. 1 that the pivoting connection is provided by a pair of rolling bearings with conical rollers 23. These rolling bearings allow the rotation of the guide member 11 relative to the support 10 about the vertical pivot axis i.e. about the axis 9 of the pillar 8.

When the pivot axis is thus positioned, the drive wheels are only subjected to very low steering torques due to the forces exerted by the ground.

Figure 3:
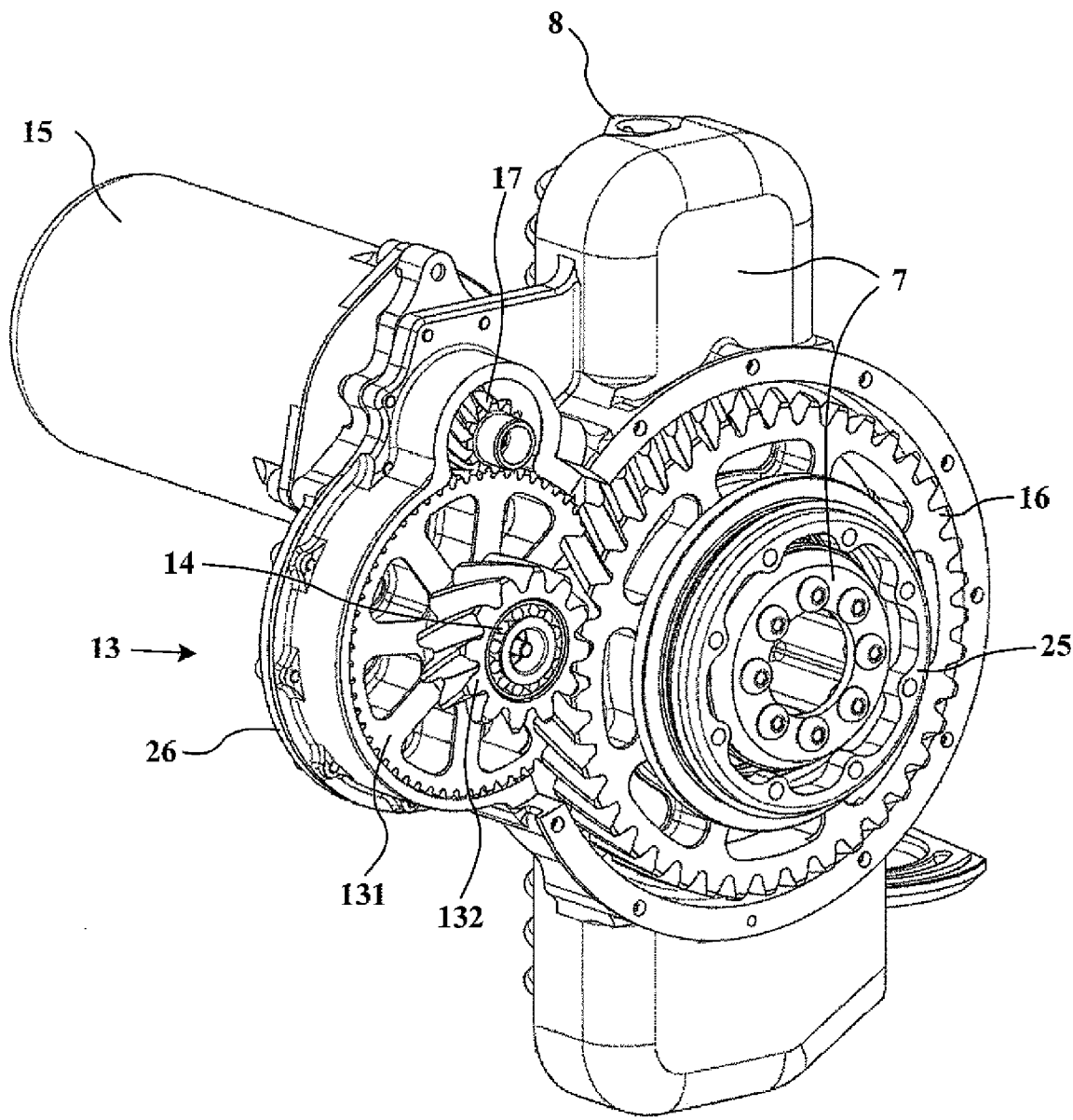
FIGS. 3 and 4: perspective views from the outside of the vehicle of the ground connection according to the invention in which the wheel has not been shown. The reduction means are apparent in FIG. 3.
Figure 4:
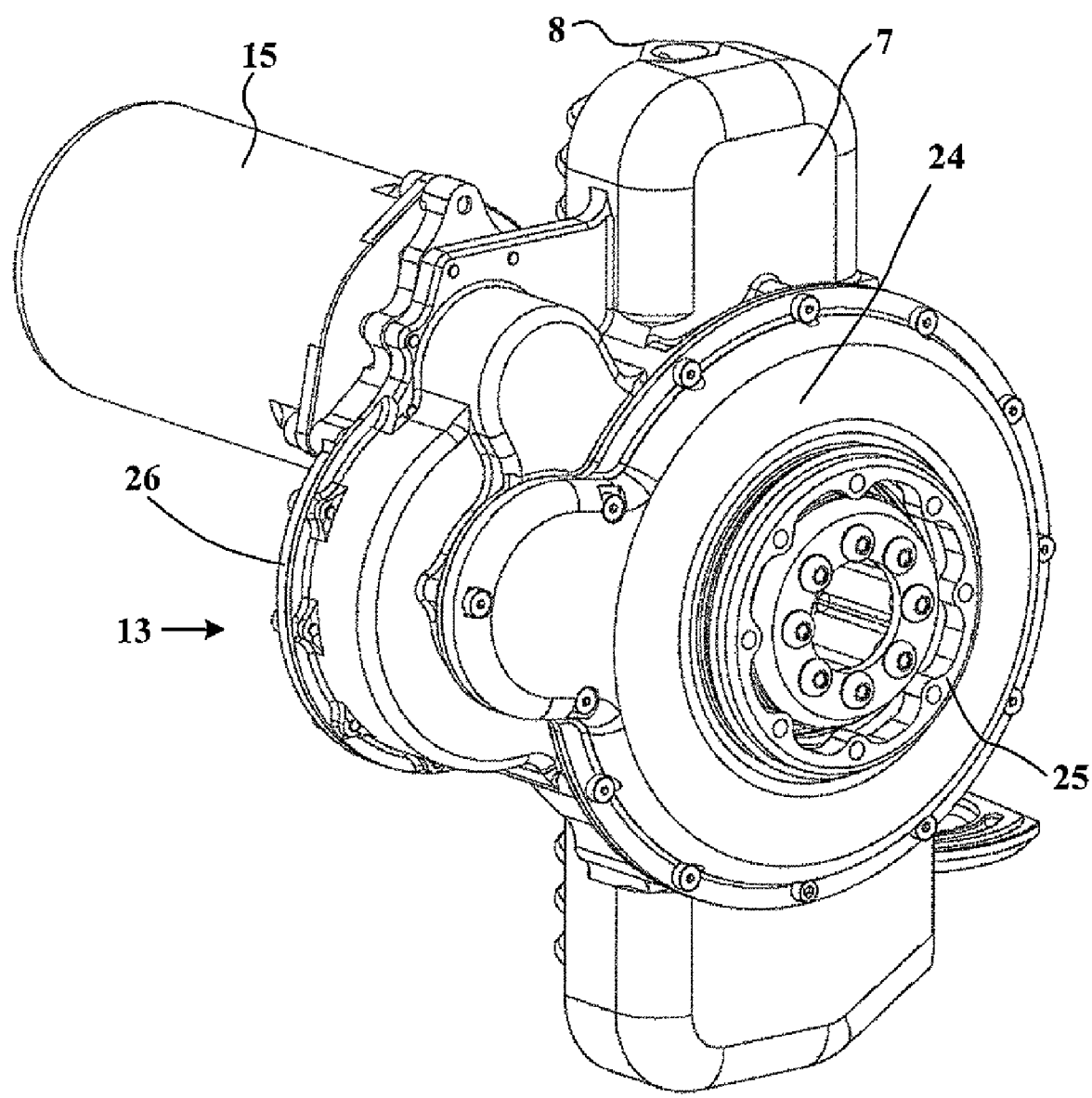

It is clearly seen in FIG. 3 that the wheel carrier 7 forms a housing receiving all the reduction means (ring gear 16, pinion 17 and reduction gear 13). This housing is closed by a first sealed cover 24 on the side of the wheel disc 3 and by a second sealed cover 26 on the inside. All the gears are thus confined in the housing. The housing may contain a suitable lubricant. Also clearly seen in this figure is the assembly of the pinion 17 and of the reduction gear 13 in said housing.

The braking or traction force available depends on the torque available on the shaft of the machine 15, on the reduction ratio and the wheel radius. For example, for a machine capable of generating a torque of 90 Nm, a reduction ratio of 17, a wheel radius of 300 mm, the traction or braking force may reach 5100 N. This force is sufficient for using 100% of the potential grip of a tire carrying a weight of 5000 N when the coefficient of grip is 1. These conditions of load and grip are standard for a modern passenger vehicle. This example has, however, the sole object of establishing the orders of magnitude, it is not intended to limit the application of the invention to a type or category of vehicle. It is understood that this force is denoted "traction force" when it acts in the direction of displacement of the vehicle and "braking force" when it acts counter to the direction of displacement of the vehicle, whether the vehicle is displaced in a forward gear or reverse gear. In reality, it is the same force, in each case originating from the torque produced by the machine 15. The braking power may thus be sufficient to be able to immobilize the wheels of the vehicle. Naturally, the complete immobilization of the wheels is not the best method of stopping a vehicle but this example is intended to facilitate the understanding of the invention.

A four-wheeled vehicle may thus in practice be equipped with four ground connections according to the invention and completely dispense with a mechanical service brake. A vehicle according to the invention may also use only two such ground connections if an axle (for example a non-driven axle) remains equipped with conventional brakes. According to the invention, it may also be possible to envisage using two or more traction/braking machines within each wheel. One advantage of this choice may be the possible redundancy of the traction means and above all the braking means.

The figures show clearly the advantage of the invention regarding the mechanical spatial requirement of the different elements. The compactness of the ground connection according to the invention makes it possible, for example, to use a sufficiently narrow wheel so that it does not come into contact with the pavement during parking maneuvers (see FIG. 1).

Figure 2:
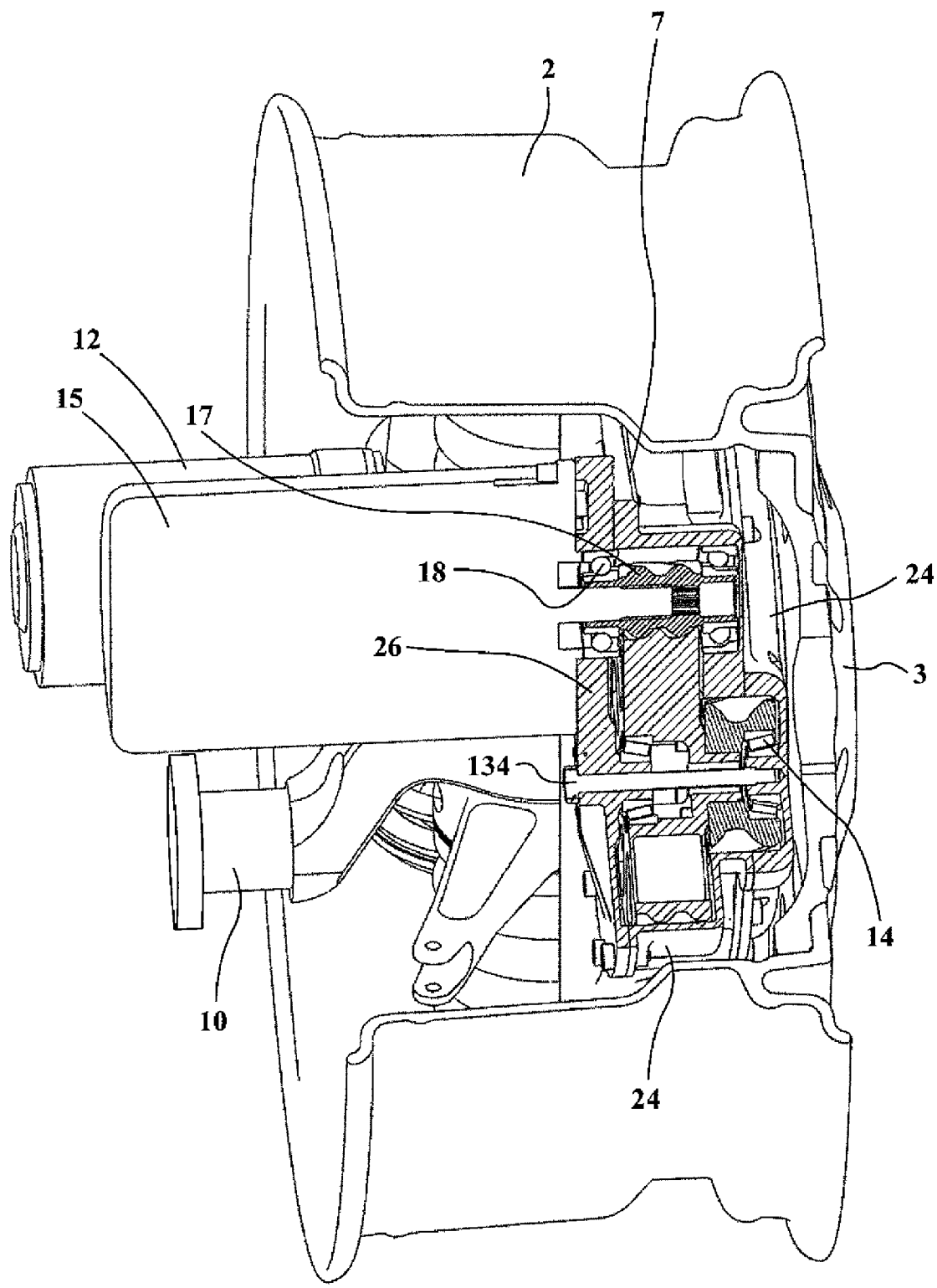
FIG. 2: view in perspective and in partial section showing in particular the reduction means of this embodiment of the invention.

Regarding weight, the advantage provided by the invention is also substantial. More specifically, the preferred embodiment of the patent application EP 0878332 (visible in FIGS. 1 and 2 of said application) may be compared to the preferred embodiment of the present application. Whilst the suspension path has been increased from 145 mm to 170 mm and the diameter at the wheel seat has been increased from 16 to 17 inches, a reduction in the order of 20% of the non-suspended mass is observed.

Moreover, the absence of a conventional mechanical braking member (see disc and caliper in the application EP 0878332) substantially simplifies the maintenance of the vehicle by eliminating the regular work of replacing pads and discs. Amongst the advantages of eliminating conventional hydraulic braking members, one may cite further the elimination of any residual friction of the pads (it is known that this friction consumes a not inconsiderable part of the energy necessary for the operation of a conventional vehicle with braking). The elimination of thermal stresses produced on the ground connection by conventional hydraulic braking members and the elimination of the disadvantages associated with dust produced by wear of the pads and the discs may also be cited as an advantage.

Figure 7:
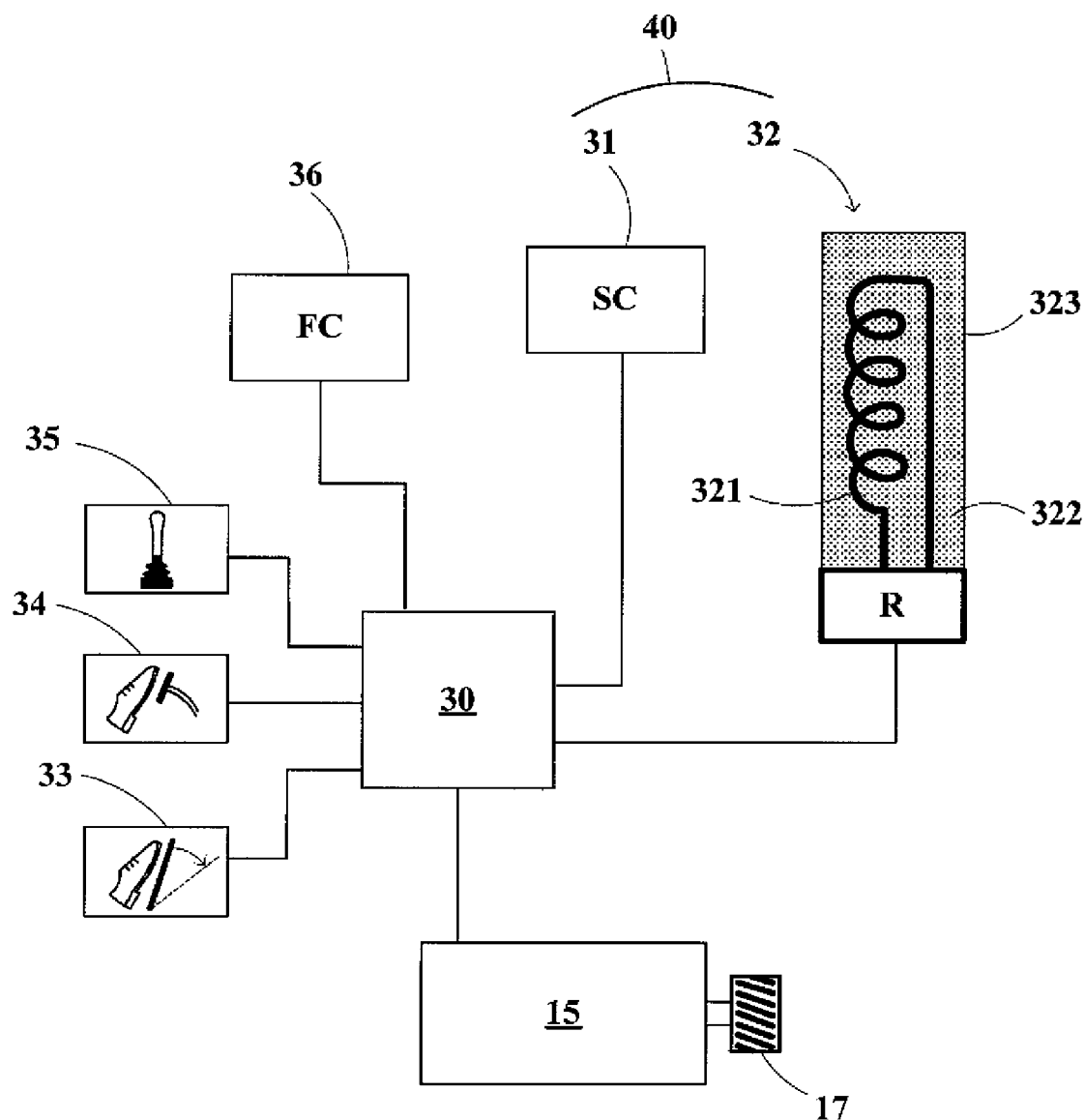
FIG. 7: schematic representation of an example of the structure and operation of the electric means providing the control of the traction/braking of the ground connection according to the invention.

FIG. 7 shows the principle of a preferred embodiment of the control of the traction and braking machine. The machine 15 is electrically connected to a controller 30. The controller 30 is connected to means for storing electrical energy 31, for example an accumulator battery and/or super-capacitors SC. The controller 30 is also connected to means for dissipating electrical energy 32, for example an electrical resistor 321 immersed in a heat-transfer liquid 322 contained in an exchanger 323, the exchanger being incorporated in a cooling circuit, not shown here. An accelerator controller 33, a brake controller 34 and a controller 35 selecting the forward gear or reverse gear make it possible to take into account the intentions of the driver. Means for producing electrical energy 36 (such as for example a fuel cell FC) may also be directly connected to the controller 30. Now a preferred embodiment of this braking/traction control will be described.

When the driver selects the forward gear and actuates the accelerator pedal 33, the controller 30 supplies power to the machine 15 from storage means 31 or production means 36 so that the vehicle moves in a forward direction. The machine transforms, therefore, electrical energy into mechanical rotational energy. The power implemented depends, in particular, on the position of the accelerator controller. When the driver actuates the brake pedal 34, the controller 30 stops the power supply to the machine and reverses its operation, the machine thus transforms the mechanical rotational energy into electrical energy. This energy may be absorbed by the storage means 31 or by the dissipation means 32 or by the two simultaneously or successively.

The storage means 31 and the dissipation means 32 constitute absorption means 40 for the electrical energy produced by the braking/traction machine. The distribution of energy absorbed between storage and dissipation is variable. It is clearly understood that when the storage means are full, 100% of the energy has to be dissipated. Moreover, the power of the storage means may be limited, i.e. the speed of loading the storage means may, for example correspond to slight braking as is currently expected from a heat engine (which is known as "engine braking"). Beyond this braking level, the electrical power produced is thus directed towards the dissipation means.

When the driver selects the reverse gear, the controller 30 may supply power to the machine 15 in a similar manner to the forward gear but for a rotation in the reverse direction (including in the case of braking).

The description which has been made is limited to the control of one traction/braking machine. In practice, the same principle may be applied to the control of a plurality of machines, each driving a wheel of the vehicle. The control may take into account additional criteria such as the speed or slippage of the wheels to limit and/or distribute in the best manner the traction/braking force over all the wheels and thus to implement electrically functions which assist the driving (ABS, ESP) with a high degree of precision.

The invention claimed is:

1. A ground connection for a vehicle comprising a wheel, a sliding suspension for a wheel carrier relative to a support connected to the vehicle, the suspension comprising a substantially vertical pillar fixed to the wheel carrier, the degree of freedom of suspension of the wheel carrier relative to the support being permitted by the movement of the pillar in the guide means connected to the support, means for driving the wheel by a first rotary electric machine mounted in the wheel, the first electric machine driving the wheel by means of reversible reduction means, the reduction means comprising a ring gear fixed to the wheel and a drive pinion connected to the first machine and defining a reduction ratio between the speed of rotation of the first machine and the speed of rotation of the wheel, the reduction ratio being greater than 10, said ground connection having no mechanical service brake.

2. The ground connection according to claim 1, wherein the reduction ratio is greater than 15.

3. The ground connection according to claim 1, wherein, in which the reduction means comprise two reduction stages.

4. The ground connection according to claim 3, wherein the reduction means comprise a reduction gear cooperating, on the one hand, with the drive pinion and, on the other hand, with the ring gear fixed to the wheel.

5. The ground connection according to claim 4, wherein the reduction gear comprises two coaxial and integral gearwheels, the teeth of the two gearwheels being helical and oriented in the same direction.

6. The ground connection according to claim 1, wherein the axis of rotation of the first machine is parallel to the axis of the wheel.

7. The ground connection according to claim 1, wherein the drive pinion has helical teeth and is guided relative to the axis of the wheel independently of the shaft of the first machine.

8. The ground connection according to claim 1, wherein the guidance of the rotating assembly comprising the wheel and the ring gear is provided by a pair of rolling bearings arranged about a male part of the wheel carrier.

9. The ground connection according to claim 1, further comprising a second rotary electric machine for controlling the suspension movements, the second machine being fixed to the guide means, a suspension pinion being driven by the second machine, the suspension pinion cooperating with a rack fixed to the pillar.

10. The ground connection according to claim 1, wherein the axis of the pillar is positioned substantially in the central plane of the wheel and intersects the axis of rotation of the wheel.

11. The ground connection according to claim 1, further comprising a pivoting connection of the guide means relative to the support in order to permit the steering of the wheel about a pivot axis.

12. The ground connection according to claim 11, wherein the pivot axis corresponds substantially to the axis of the pillar.

13. A vehicle comprising a ground connection according to claim 1, and further comprising means for absorption of electrical energy capable of absorbing the electrical energy produced by the first electrical machine during braking.

14. The vehicle according to claim 13, wherein the absorption means comprise an electrical resistor immersed in a bath of heat-transfer liquid.

15. The vehicle according to claim 13, wherein the means for absorption comprise means for storing electrical energy capable of storing a portion of the electrical energy produced by the first electrical machine during braking.

* * * * *